(12) United States Patent
Li

(10) Patent No.: US 9,681,612 B2
(45) Date of Patent: Jun. 20, 2017

(54) WATERING SYSTEM FOR PLANTS

(71) Applicant: Yi-Hsi Li, Kaohsiung (TW)

(72) Inventor: Yi-Hsi Li, Kaohsiung (TW)

(*) Notice: Subject to any disclaimer, the term of this patent is extended or adjusted under 35 U.S.C. 154(b) by 291 days.

(21) Appl. No.: 14/576,351

(22) Filed: Dec. 19, 2014

(65) Prior Publication Data

US 2016/0174477 A1 Jun. 23, 2016

(51) Int. Cl.
*A01K 27/00* (2006.01)
*A01G 27/00* (2006.01)

(52) U.S. Cl.
CPC ......... *A01G 27/003* (2013.01); *A01G 27/005* (2013.01); *A01G 27/008* (2013.01)

(58) Field of Classification Search
CPC .... A01G 27/00; A01G 27/003; A01G 27/005; A01G 27/006; A01G 27/008; A01G 25/16
See application file for complete search history.

(56) References Cited

U.S. PATENT DOCUMENTS

| 3,455,054 | A | * | 7/1969 | Tibbals, Jr. | A01G 25/06 137/268 |
| 3,926,143 | A | * | 12/1975 | Hothan | G01F 23/58 116/228 |
| 4,194,691 | A | * | 3/1980 | Birnbach | A01G 25/167 239/63 |
| 4,447,983 | A | * | 5/1984 | Shinada | A01G 27/005 47/48.5 |
| 4,557,071 | A | * | 12/1985 | Fah | A01G 27/003 47/48.5 |
| 4,685,827 | A | * | 8/1987 | Sibbel | A01G 27/005 239/542 |
| 5,259,142 | A | * | 11/1993 | Sax | A01G 27/006 239/38 |
| 5,337,930 | A | * | 8/1994 | Fah | A01C 23/042 222/145.1 |
| 7,748,930 | B2 | * | 7/2010 | Gesser | A01C 23/042 405/43 |
| 2016/0081279 | A1 | * | 3/2016 | Lai | A01G 27/02 47/79 |
| 2016/0120139 | A1 | * | 5/2016 | Lee | A01G 27/06 47/81 |

* cited by examiner

*Primary Examiner* — Kathleen Alker
(74) *Attorney, Agent, or Firm* — Rosenberg, Klein & Lee

(57) ABSTRACT

A watering system includes a bottle unit or a water level control unit which has a float member to control the water level of the tank in a planting hole. The float member controls the operation of the water inlet valve and the water level in the bottle unit so as to control the amount of water that the planting hole provides to the soil outside the planting hole without using electricity. The plants are properly watered automatically all day long. The water permeates into the soil outside the planting hole to water the plants that are planted in a larger area. The watering system is suitable for watering the plants in a large area or in pots.

11 Claims, 11 Drawing Sheets

FIG.5

WATERING SYSTEM FOR PLANTS

BACKGROUND OF THE INVENTION

1. Fields of the Invention

The present invention relates to a watering system, and more particularly, to a watering system for providing water to plants without use of electricity.

2. Descriptions of Related Art

The conventional way for watering plants is to use a bottle in which water is received, and manually pour the water from the bottle. A more advanced method is to install sprinklers which are cooperated with a water supply system to water the plants according pre-set time schedule. However, both of these methods cannot precisely control the amount of water that is absorbed by the soil and the plants. Different plants need different amount of water, so that the conventional ways cannot meet the requirements of the differences. Besides, when watering a huge planting area, it takes a lot of time and labor power. Furthermore, the sprinklers require significant expenses and is not suitable for the plants in a smaller area. For the plants in pots, exceed water flows over the pot easily contaminates the floor and may attract mosquitoes.

The present invention intends to provide a watering system to eliminate the shortcomings mentioned above.

SUMMARY OF THE INVENTION

The present invention relates to a watering system and comprises at least one planting hole, a water level control unit or a bottle unit. The at least one planting hole has a tank located therein and a water pipe is located at the inner end of the at least one planting hole and communicating with the bottom of the tank. The water level control unit is located beside the planting hole and has an inlet valve and a tubular member. The inlet valve has an inlet end. A guide pipe has a first end connected to the inlet valve and communicates with the inlet end. A second end of the guide pipe is connected to the tubular member which has an outlet. A first end of the water pipe is connected to the outlet of the tubular member. A float member is located in the tubular member and located above the outlet. The float member is connected with the inlet valve and controls the inlet valve.

An observation member is connected to and communicated with the water pipe. The water pipe has at least one hole which communicates with the tank of the planting hole. The observation member has a float tube. The bottle unit has a bottle, a tube and a height adjuster. The bottle unit is connected to the observation unit to supply water to the observation unit. The bottle unit is cooperated with the water level control unit, or replaces the water level control unit. The float member shuts off the inlet valve when the water level in the tubular member is higher than a pre-set position. The float member turns on the inlet valve when the water level in the tubular member is lower than a pre-set position such that the water level in the tank is maintained.

Preferably, a seal is connected to the inlet valve and located corresponding to the inlet end. A movable member extends through the seal. A pivotal member has a contact member at a first end thereof and the contact member is connected to the movable member. A second end of the pivotal member is connected to the float member. When the float member moves, the pivotal member is pivoted and the contact member drives the movable member to push the seal which seals the inlet of the inlet valve such that the water level of the tank is controlled.

Preferably, the observation unit has multiple slots defined through the wall thereof. The observation unit that does not have the bottle unit or the float tube has a dust cap mounted to the top thereof.

Preferably, at least one container is located in tank and the outlet communicates with the container.

Preferably, there multiple planting holes and each of the planting holes has a container located in the tank. Each of the containers has a water pipe extending therethrough. The water pipes of the containers are trained together by multiple connection pipes. One of the water pipes is connected to the outlet.

Preferably, the connection pipe of one of the containers is connected with a transparent tube. The transparent tube is located corresponding to the float member and the tubular member.

Preferably, the inlet valve has an outlet end which is movably inserted into the guide pipe so as to adjust the float member and the water level control unit. A securing member is connected to the outlet end to secure the outlet end.

Preferably, the float member is connected with a rod which extends through a cover on the tubular member and is connected to the pivotal member.

Preferably, the rod has a first end connected to the float member, and a second end of the rod has a threaded section which is threadedly connected to a locking hole of the pivotal member.

Preferably, the inlet end of the inlet valve is connected to a water supply device. A pressure reduction unit is connected between the inlet end of the inlet valve and the water supply device.

Preferably, when using the bottle unit to water plants, the bottle unit comprises a bottle, a tube and a height adjuster. The bottle is connected to the observation unit. The bottle is replaceable by the water level control unit. The height adjuster has a threaded tube which is threadedly connected to the height adjuster so as to adjust the threaded tube relative to the height adjuster. The bottle has an open end which is connected with the tube which has a lower open end. The tube is inserted into the threaded tube in the height adjuster. The bottle is adjusted relative to the observation unit by the threaded tube and the height adjuster so as to control the water level of the tank.

The advantages of the present invention is that the planting hole of the present invention is filled with soil, and the water level control unit is connected with a hose. By the float member of the water level control unit and the inlet valve, the water level in the tank and the water level in the tubular member is substantially at the same height. The movement of the float member of the water level control unit controls the water level of the tank so as to adjust the distance between the water level in the planting hole and the open top of the tank. Therefore, when the float member of the water level control unit moves lower, the distance between the water level in the planting hole and the open top of the tank is increased, the water is difficult to reach the open top of the tank due to gravity and the permeating force of the water, such that the amount of water reaching the soil outside of the tank is reduced. On the contrary, when the float member of the water level control unit moves higher, the water level of the planting hole increases and the distance between the water level in the planting hole and the open top of the tank is shortened, the water is easily to reach outside of the tank and the amount of water reaching the soil outside of the tank is increased. When the float member moves upward to drive the seal to seal the inlet vale when the water level of the water level control unit reaches a pre-set height. When the float member moves downward to remove the seal from the inlet vale when the water level of the water level control unit is lowered to a pre-set height.

The present invention also provides a bottle unit which is used to water the plants in one to three pots to save expenses. The water bottle unit is connected to the observation member and the tube is inserted into the planting hole. When the water level in the planting hole is higher than the lower open end of the tube, the pressure in the bottle unit is balanced with the atmosphere so that the water bottle unit stops to supply water. On the contrary, when the water level in the planting hole is lower than the lower open end of the tube, there is a difference between the pressure in the bottle unit and the atmosphere so that the water bottle unit starts to supply water so as to automatically maintain the water level of the planting hole.

The present invention does not need electricity to supply water to the soil outside the planting hole, such that the plants are supplied with suitable amount of water. The plants can be watered automatically to save the use of water and the owner's time. The plants are not drawn or dried out because of improper way of water supply. The outlet is located within the soil so that the water is not lost easily. The roots of the plants are convenient to absorb water and the owner easily manages the watering of the plants.

The present invention is suitable for watering the plants in one pot. The pots can also be connected to each other by using connection pipes and the tanks, such that the present invention is able to water the plants in a larger area such that the expenses, the time and the cost of labor can be saved.

The present invention uses the transparent pipe or the observation member and the float member to easily observe the water level of the tubular member and the tank. Because the water level in the tank affects the level of permeation of water in the soil so that when the water level is too high or too low relative to the plants or the level of permeation in the soil, the securing member is adjusted to adjust the position of the outlet end in the guide tube such that the height of the float member in the water control unit is adjusted. By the adjustment of the threaded section of the rod relative to the locking hole, the height of the float member can be micro-adjusted to precisely set the water level of the tank. Accordingly, the water level of the tank is able to control the amount of water entering into the soil to provide the suitable amount water to the plants. Furthermore, by adjusting the water level control unit and the height of the float member, not only the water level of the tank can be controlled, the present invention can also be used on different terrains or different types of water supply devices.

When the water pressure from the water supply is too high, the pressure reduction unit is used to regulate the water pressure to prevent failure of the seal of the inlet valve.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 5 shows the first embodiment of the present invention, wherein the water level of the tank is high and the amount of water that flows to the outside of the tank increases;

DETAILED DESCRIPTION OF THE PREFERRED EMBODIMENT

Figure 1:
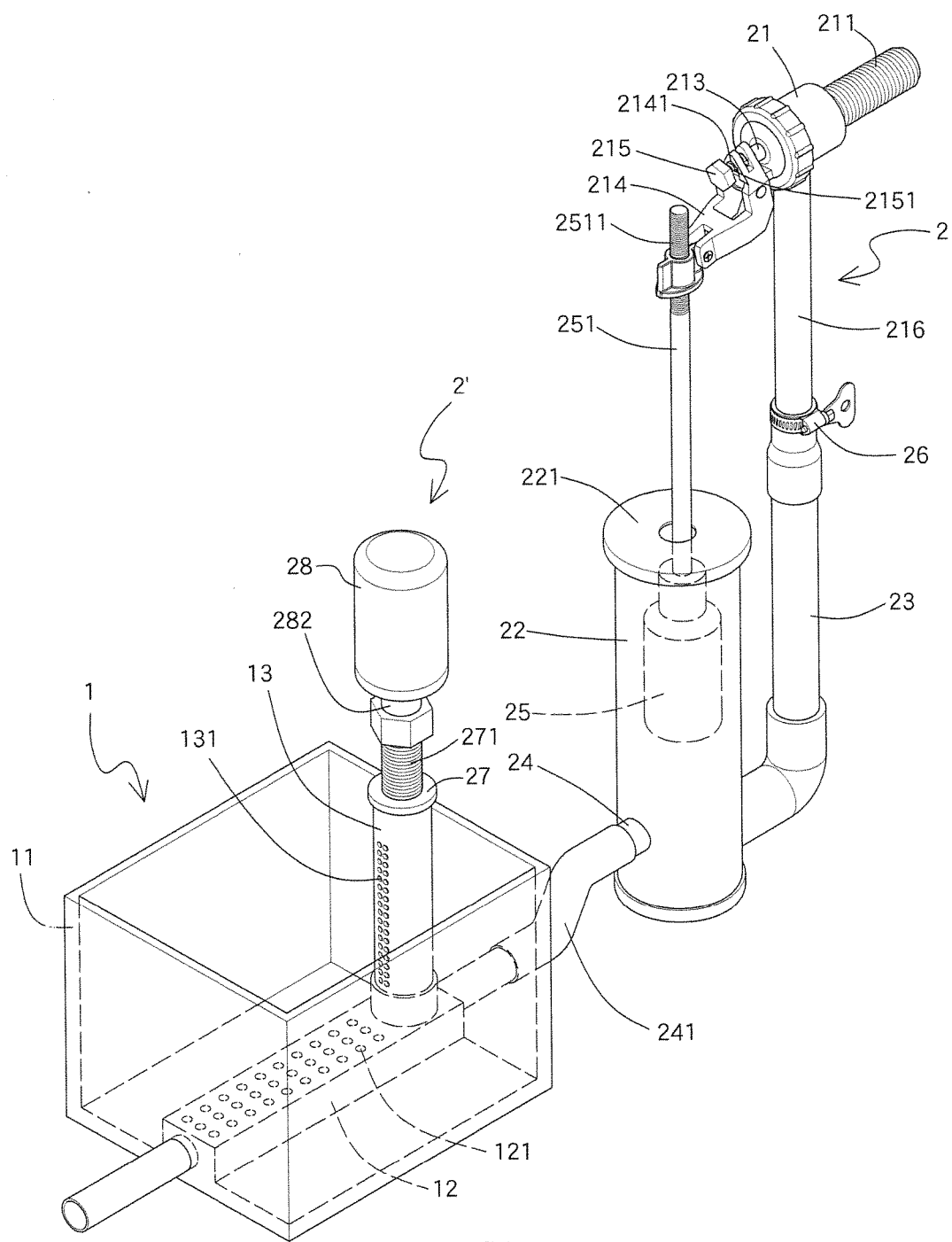
FIG. 1 is a perspective view to show the watering system of the present invention.
Figure 2:
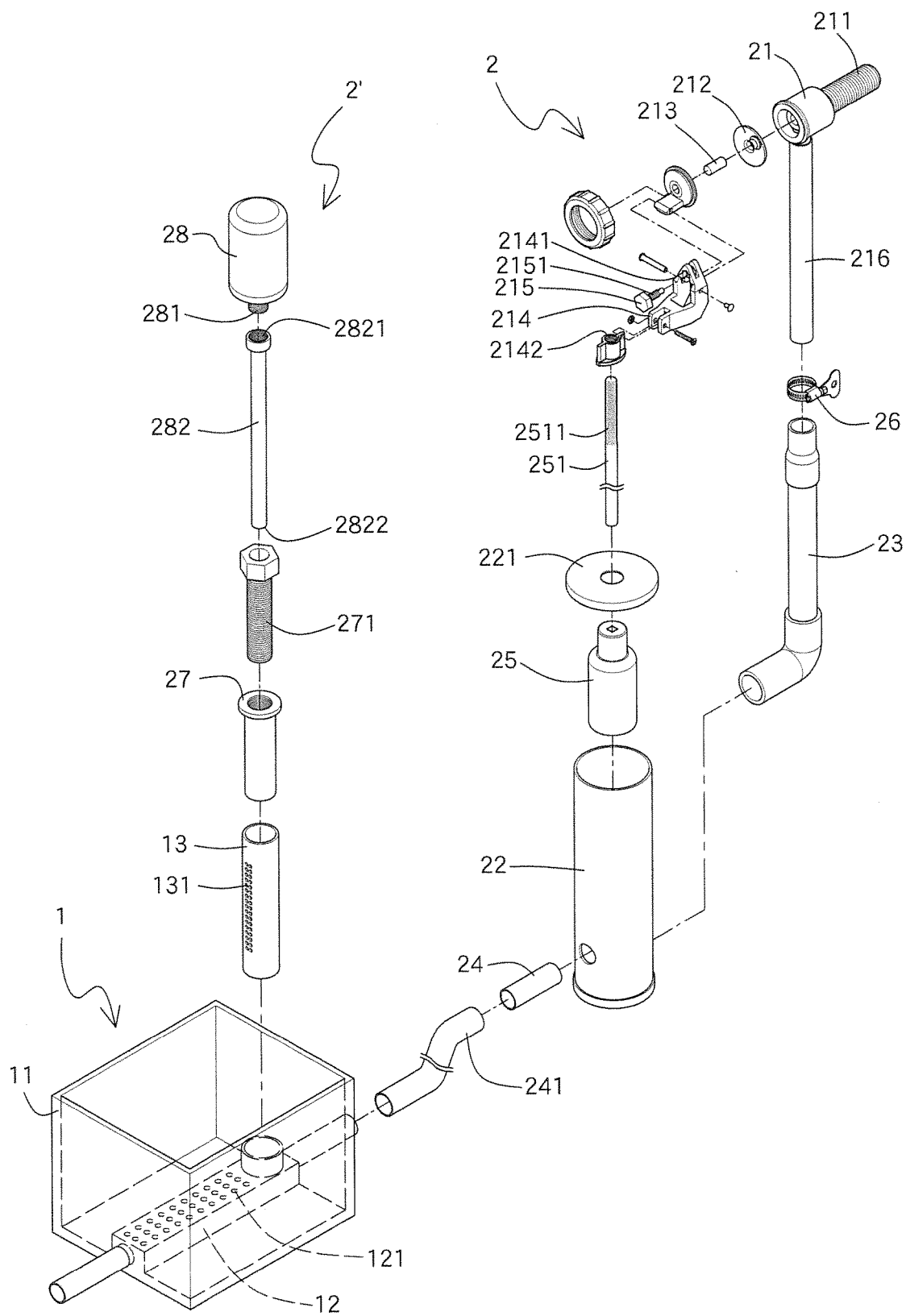
FIG. 2 is an exploded view of the watering system of the present invention.
Figure 8:
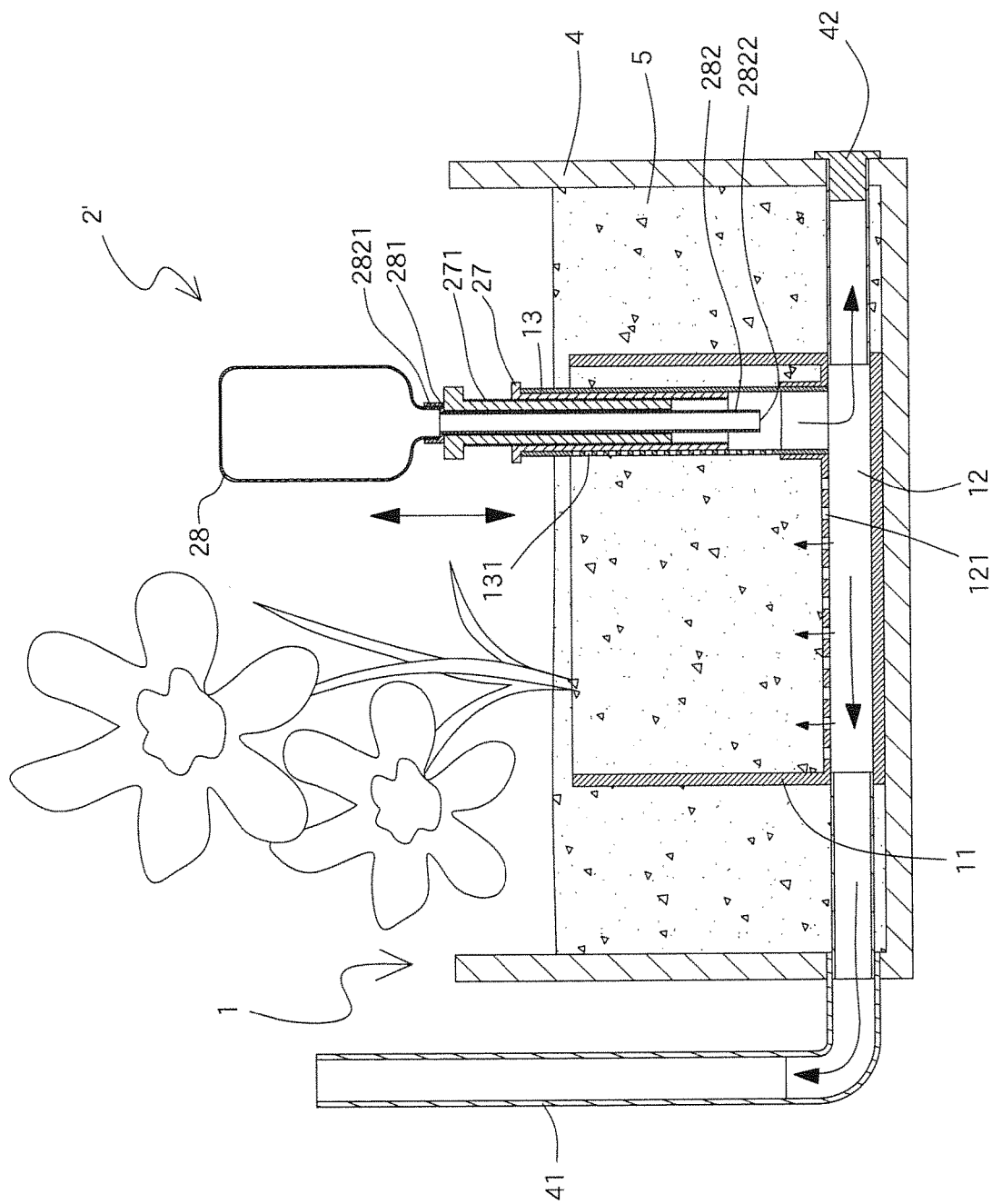
FIG. 8 shows the second embodiment of the present invention for showing of the use of a bottle unit to water the plants in one or less than three pots.

Referring to FIGS. 1 and 2, the watering system of the present invention comprises a planting hole 1, a water level control unit 2 or a bottle unit 2'. The planting hole 1 has a tank 11 (water cannot permeate through the tank) located therein and a water pipe 12 is located at the inner end of the planting hole 1 and communicates with the bottom of the tank 11. An observation member 13 is perpendicularly connected to and communicated with the water pipe 12. The water pipe 12 has at least one hole 121 which communicates with the tank 11. The observation member 13 has multiple slots 131 defied through the wall thereof and the slots 131 are located lower than the top of the tank 11. The observation member 13 has a float tube 14 or the bottle unit 2'. The bottle unit 2' has a bottle 28, a tube 282 and a height adjuster 27. When the observation member 13 is not cooperated with the float tube 14, a dust cap 132 is mounted to the open top of the observation member 13 as shown in FIG. 8.

The water level control unit 2 is located beside the planting hole 1 and has an inlet valve 21 and a tubular member 22. The inlet valve 21 has an inlet end 211. A guide pipe 23 has a first end connected to the inlet valve 21 and communicates with the inlet end 211. A second end of the guide pipe 23 is connected to the tubular member 22 which has an outlet 24. A first end of the water pipe 12 is connected to the outlet 24 of the tubular member 22. A float member 25 is located in the tubular member 22 and located above the outlet 24. The float member 25 is connected with the inlet valve 21 and controls the inlet valve 21. When the float member 25 is located higher than a pre-set value, the inlet valve 21 is shut off. When the float member 25 is located lower than a pre-set value, the inlet valve 21 is turned on. By this arrangement, the water level of the tank 11 is maintained. A water supply device 3 is connected to the inlet end 211.

A seal 212 is connected to the inlet valve 21 and located corresponding to the inlet end 211. A movable member 213 extends through the seal 212. A pivotal member 214 has a contact member 215 at a first end thereof and the contact member 215 is connected to the movable member 213. A second end of the pivotal member 214 is connected to the float member 25. When the float member 25 moves, the pivotal member 214 is pivoted and the contact member 215 drives the movable member 213 to push the seal 212 which seals the inlet 211 of the inlet valve 21 such that the water level of the tank 11 is controlled. The float member 25 is connected with a rod 251 which extends through a cover 221 on the tubular member 22 and is connected to the pivotal member 214. The cover 221 does not seal the top of the tubular member 22 so as to prevent foreign object from entering the tubular member 22 to affect the operation of the float member 25 or the water level. The pivotal member 214 has a threaded hole 2141 and the rod 215 has a threaded section 2151 which is threadedly connected to the threaded hole 2141. This connection is just an example for describing the connection between the rod 215 and the pivotal member 214. The inlet valve 21 has an outlet end 216 which is movably inserted into the guide pipe 23 so as to adjust the float member 25 and the water level control unit 2. A securing member 26 is connected to the outlet end 216 to secure the outlet end 216 at a desired position.

At least one container 4 which is located in tank 11 and the outlet 24 communicates with the container 4. A transparent pipe 41 extends through the container 4 and communicates with the water pipe 12. The length and the position of the transparent pipe 41 are located corresponding to the tubular member 22 and the float member 25.

Figure 3:
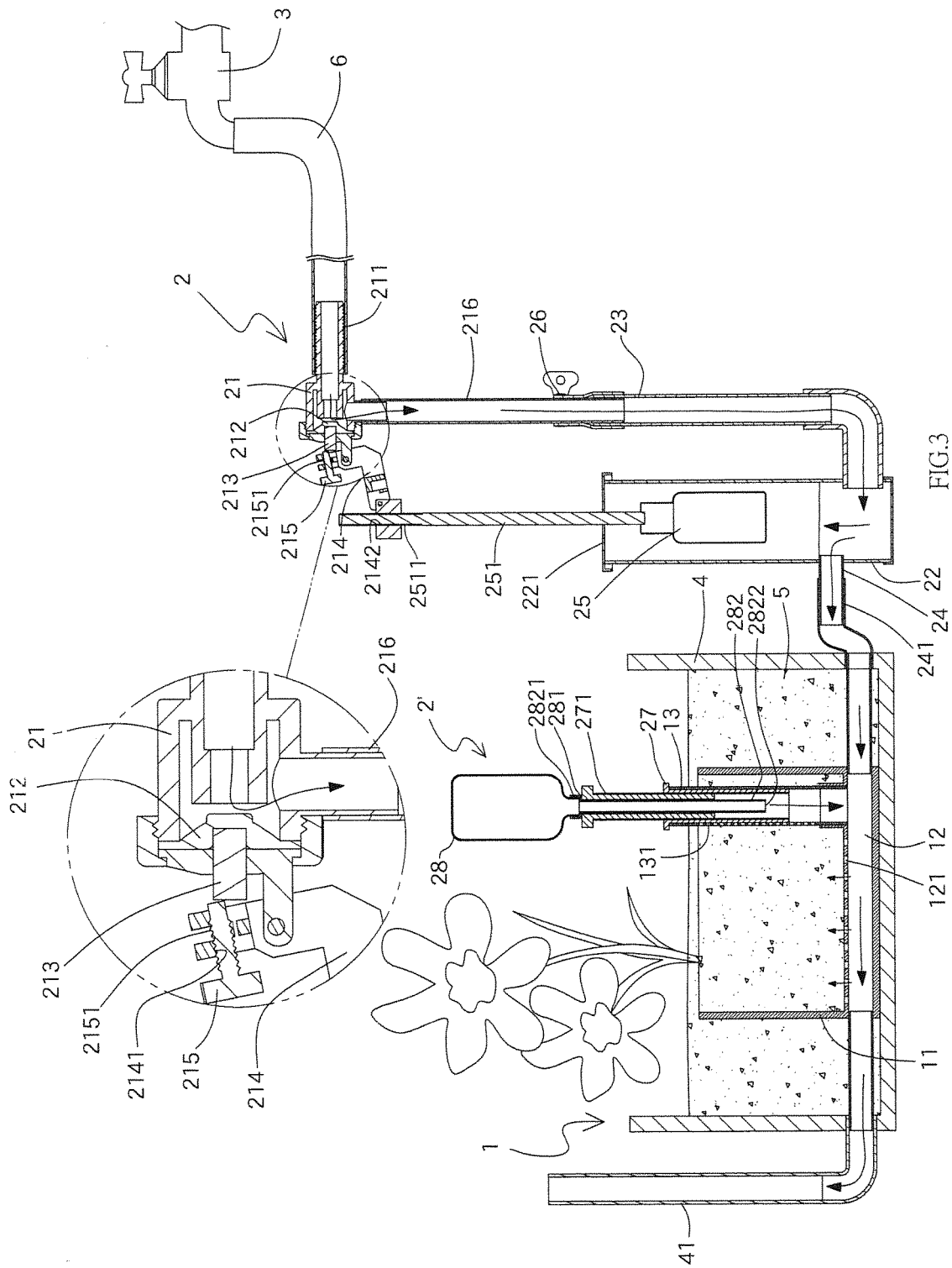
FIG. 3 shows the first embodiment of the present invention, wherein the water level of the tank is lowered and the water is automatically fed.
Figure 4:
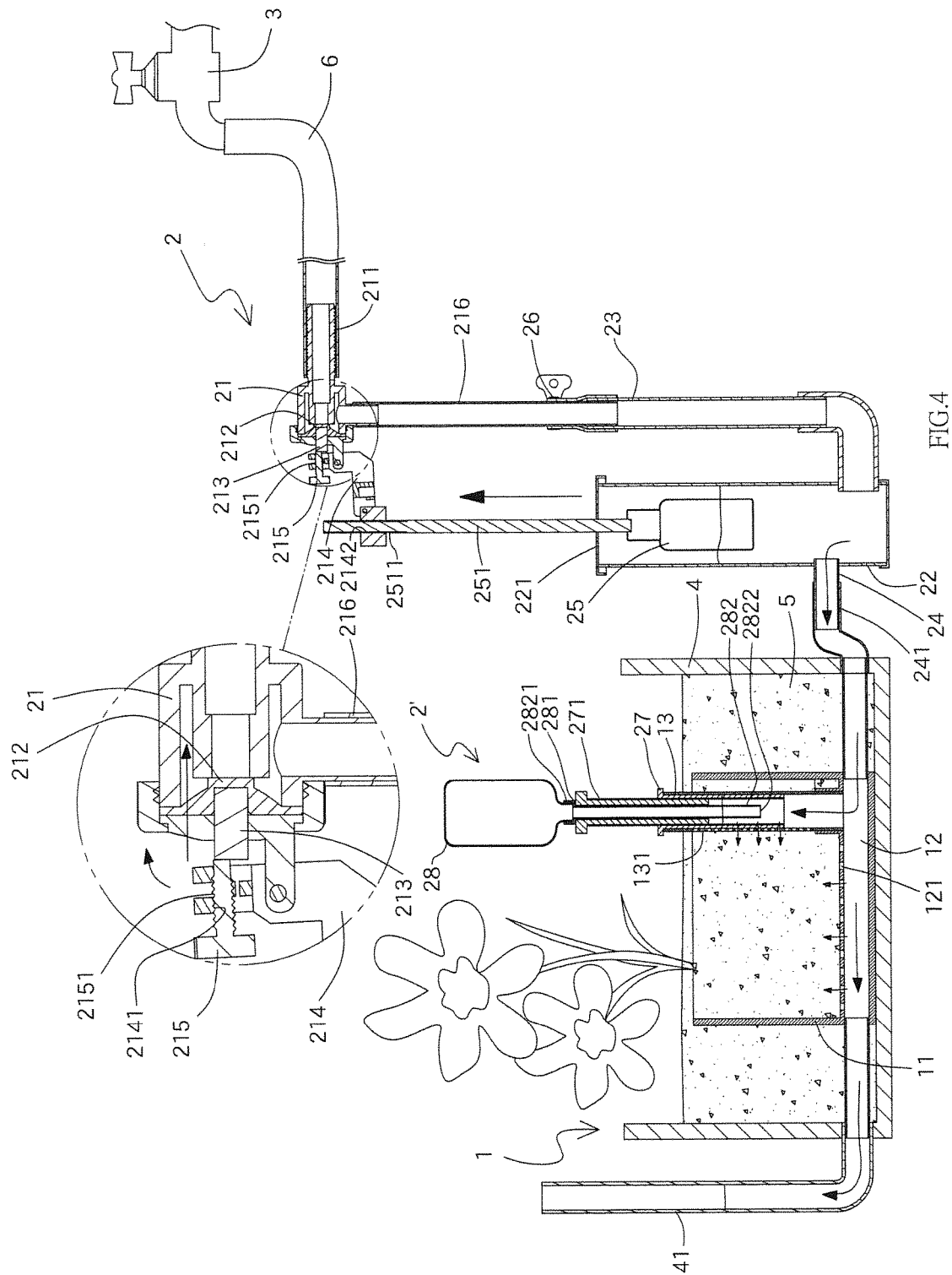
FIG. 4 shows the first embodiment of the present invention, wherein the water level of the tank goes up and the water stops to feed automatically.

As shown in FIGS. 3 and 4, when operating the first embodiment of the present invention, the container 4 such as a pot is put in the planting hole 1 and the water level control unit 2 is directly connected to the water pipe 12 of the tank 11 by the outlet 24, or by using a hose 241 that extends through the container 4 and is connected to the water pipe 12. Soil 5 is put in the container 4 which is put in the planting hole 1, the position of the container 4 is not over the top of the observation member 3. Alternatively, a bottle unit 2' is used to be connected to the observation member 3, and a hose 6 is connected between the inlet end 211 and the water supply device 3 such as a faucet. In order to be connected with the water supply device 3 of meet the requirements of different terrains, by using the height adjuster 27 or by adjusting the position of the outlet end 216 in the guide pipe 23 by using the securing member 26, the position of the open end 281 of the bottle unit 2' or the water level control unit 2 and the float member 25 can be controlled, such that the water level of the tank 11 of the planting hole 1 is initially controlled. The hose 6 is flexible so as to be securely connected to the inlet end 211.

As shown in FIG. 3, when the water supply device 3 is opened, the pressure of the bottle unit 2' drops and the water is supplied to the planting hole 1, the water from the water supply device 3 enters from the inlet end 211 of the inlet valve 21. Because there is no water in tank 11 of the planting hole 1 and the tubular member 22, so that the float member 25 is located at the bottom of the tubular member 22. The movable member 213 cannot be operated by the contact member 215 and the rod 251 so that the seal 212 does not seal the inlet end 211. The water from the water supply device 3 flows through the inlet end 211, the guide pipe 23, the tubular member 22, the water pipe 12 of the tank 11, and the observation member 13. The water level in the water pipe 12 gradually goes up and the water flows through the hole 121 and is absorbed by the soil 5 in the tank 11 via the slots 131. The water in the observation member 13 flows to the tank 11 via the slots 131. The water level in the tank 11 goes up and when the permeation force of the water in the soil 5 is greater than gravity, the water goes upward and overflows from the open top of the tank 11 and is absorbed by the soil 5. Therefore, the roots of the plants can directly absorb the water. Therefore, by controlling the water level of the tank 11, the amount water supplied to the soil 5 from the planting hole 1 can be controlled. As shown in FIG. 4, when the water level in the tank 11 reaches its full position, because the tank 11, the transparent pipe 41, the observation member 13 and the tubular member 22 communicate with each other, so that under the same pressure, the water level of each of the parts is located at the same height. Besides, because the dust cap 132 and the cover 221 do not completely seal the observation member 13 and the tubular member 22, so that the water levels in each of the observation member 13 and the tubular member 22 are located at the same position. The dust cap 132 and the cover 221 are used to prevent foreign object from entering into and blocking the observation member 13 and the tubular member 22.

As shown in FIG. 4, because the water level of the tank 11 and the tubular member 22 is at the same height, so that when the water level of the tank 11 and the tubular member 22 goes up and is higher than the lower open end 2822 of the tube 282 of the bottle unit 2' on the observation member 13, the pressure in the bottle unit 2' and the pressure outside the watering system of the present invention are balanced, the bottle unit 2' stops to provide water. The float member 25 moves up and the rod 251 pivots the pivotal member 214, the movable member 213 is driven to push the seal 212 to seal the inlet end 211, such that the inlet valve 21 is shut off. The water level in the tank 11 is maintained.

On the contrary, as shown in FIG. 3, when the water level in the tank 11 moves down due to the soil 5 or the plants absorbing the water, the water level in the tubular member 22 moves down as well. When the water level of the tank 11 and the tubular member 22 is lower than the lower open end 2822 of the tube 282 of the bottle unit 2' on the observation member 13, the pressure in the bottle unit 2' is larger than the pressure outside the watering system of the present invention, the bottle unit 2' starts to provide water. The float member 25 moves down and the rod 251 pivots the pivotal member 214 in opposite direction, the movable member 213 is not driven by the contact member 215 so that the seal 212 is removed from the inlet end 211, such that the inlet valve 21 is turned on. Water from the water supply device 3 is supplied via the inlet valve 21, the water level in the tank 11 goes up. By repeating the processes mentioned above, the positions of the bottle unit 2' and the water level control unit 2 are controlled according to the condition of the soil 5, the plants and the weather, such that the water level of the tank 11 is controlled.

Figure 5:
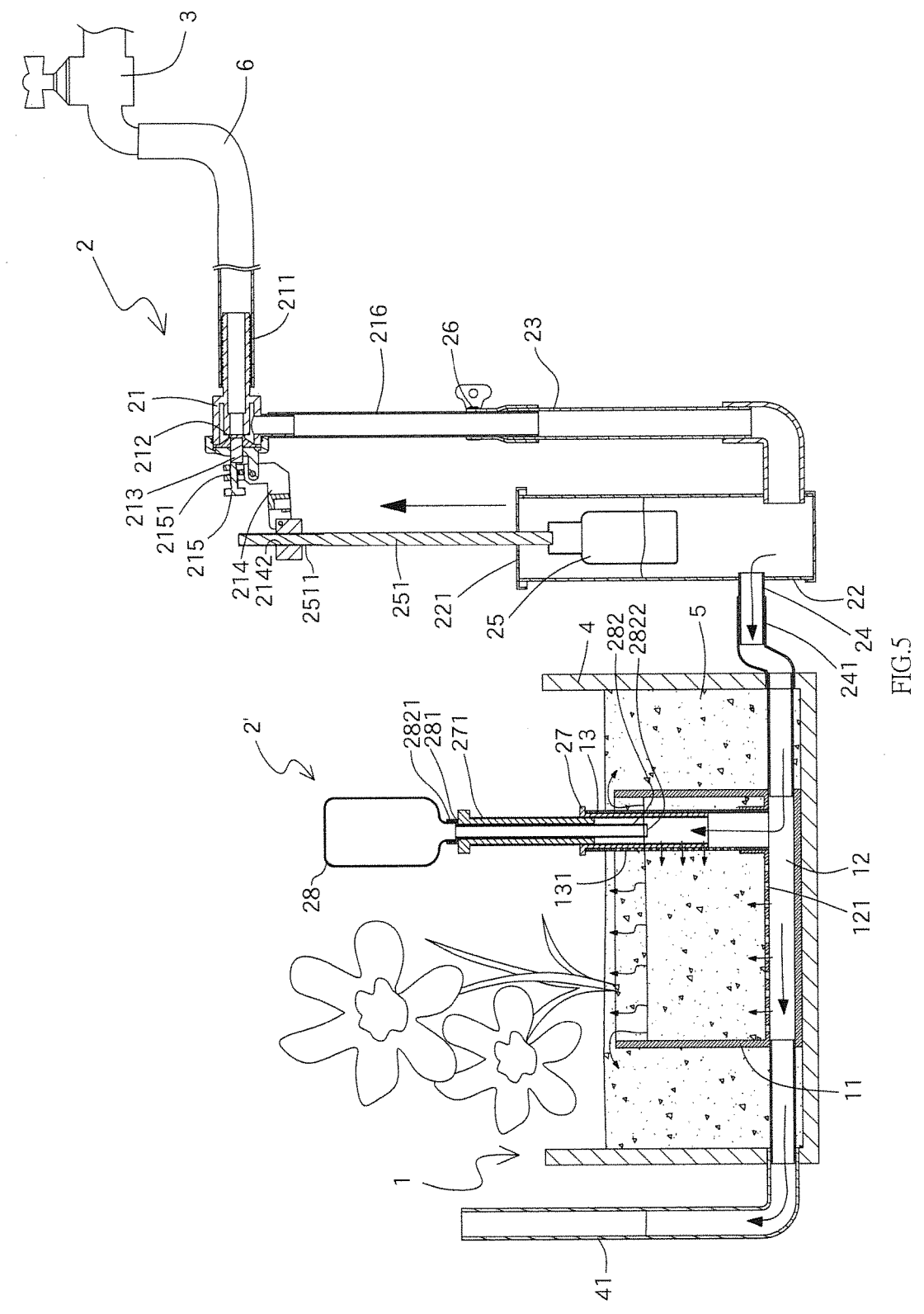
Figure 6:
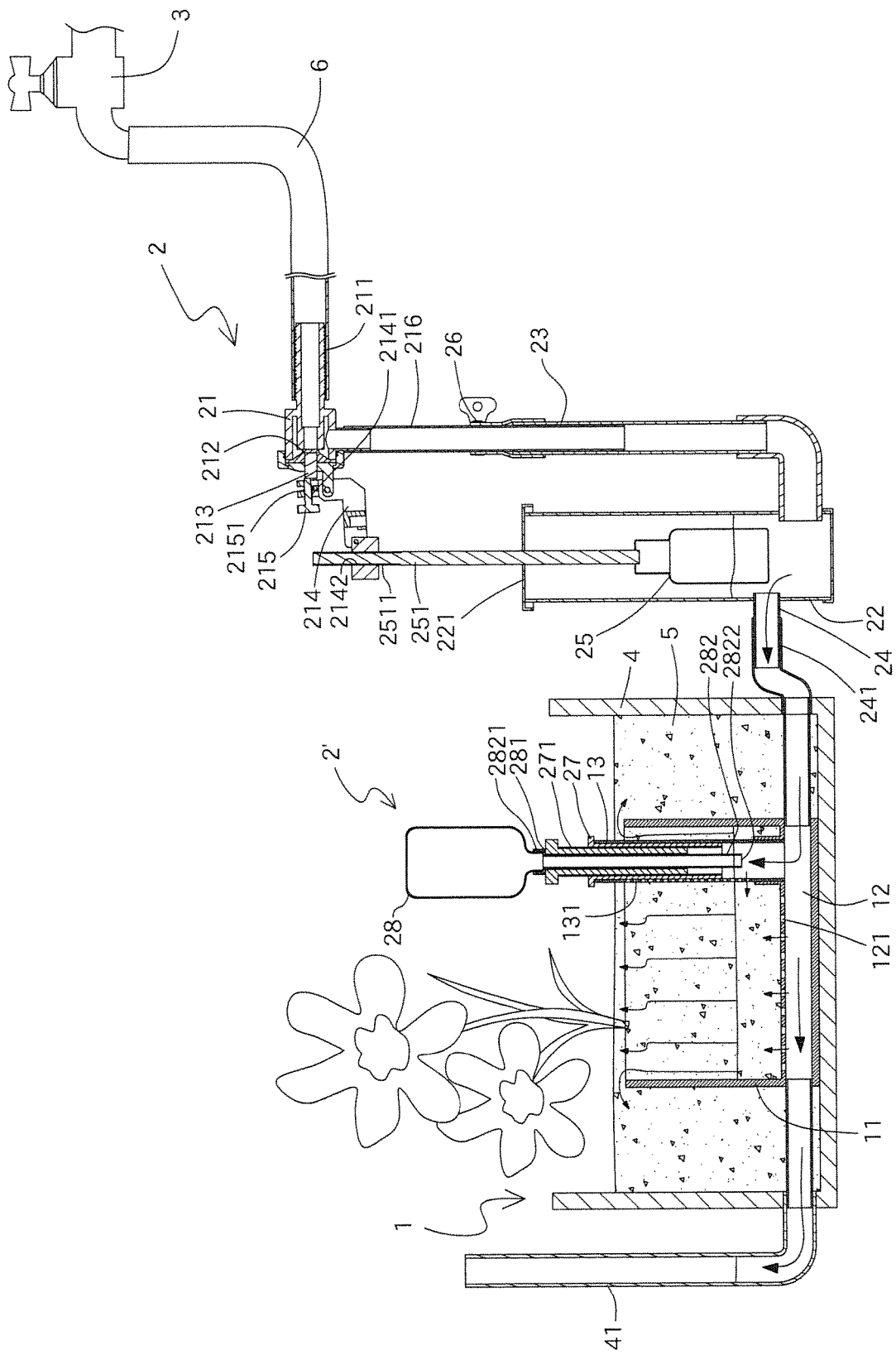
FIG. 6 shows the first embodiment of the present invention, wherein the water level of the tank is low and the amount of water that flows to the outside of the tank reduces.
Figure 7:
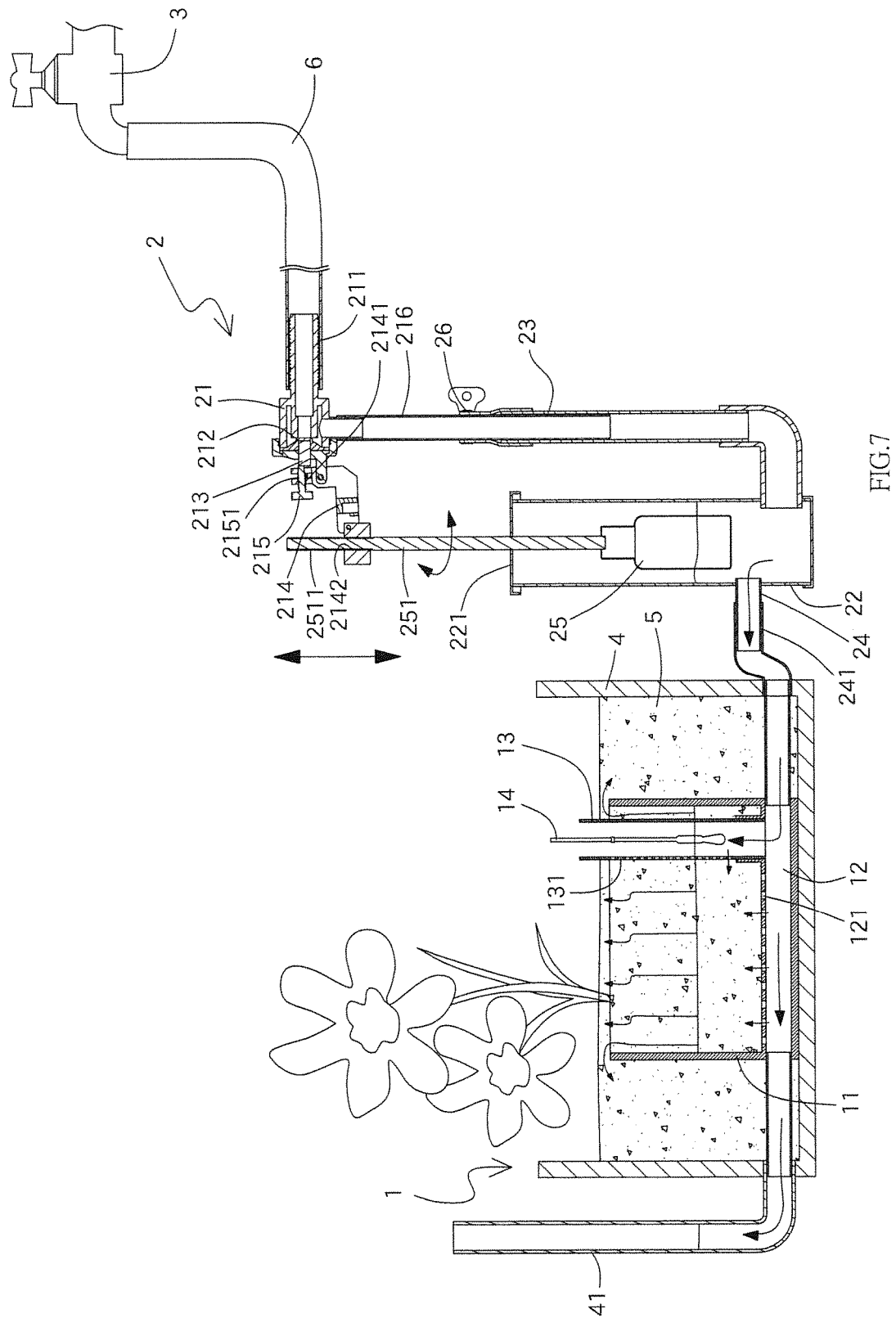
FIG. 7 shows the first embodiment of the present invention, wherein the rod is rotated to micro-adjust the height of the float member.

It is noted that the position of the water level in the tank 11 may vary due to the different nature of the plants and soil 5, because the permeation force of the water and the gravity alternatively affect each other, when the water level is located close to the open top of the tank 11 as shown in FIG. 5, the water can easily permeate to outside of the tank 11 to increase the amount of water supplied to the outside of the tank 11. When the water level is located far from the open top of the tank 11 as shown in FIG. 6, the water cannot easily permeate to outside of the tank 11 so that the amount of water supplied to the outside of the tank 11 is reduced. In order to allow the owner to adjust the water level of the tank 11 according to the natures of the plants and the soil 5, the owner can check the water level via the transparent pipe 41, or as shown in FIG. 7, by removing the dust cap 132 from the observation member 13, and put a float tube 14 in the observation member 13 to check the water level. If the owner does not use the transparent pipe 41 to check the water level, he or she can insert a seal 42 as shown in FIG. 8 to the lower end of the water pipe 12. By adjusting the height of the bottle unit 2', the height adjuster 27 or the securing member 26, the position of the outlet end 216 is adjusted in the guide pipe 23 so as to adjust the position of the bottle unit 2', or the water level control unit 2 and the float member 25. As shown in FIG. 5, when the lower open end 2822 of the tube 282 of the bottle unit 2' and the float member 25 are located higher positions, the water level of the bottle unit 2' and the water level control unit 2 control the water level in the tank 11 is the same as the position of the float member 25, so that the water level is close to the open top of the tank 11 and the amount of water that is supplied to the outside of the tank 11 is increased. When the owner wants to reduce the amount of water supplied to the outside of the tank 11, he or she can lower the water bottle unit 2' and the float member 25 of the water level control unit 2. As shown in FIG. 6, the positions of the lower open end 2822 of the tube 282 of the bottle unit 2' and the float member 25 are located at lower positions, the water level of the tank 11 is located at the same position as the float member 25, so that the distance between the water level and the open top of the tank 11 is increased, water is not easily flows over the open top of the tank 11, the amount of water that supplied to outside of the tank 11 is reduced. Besides, by adjusting the depths that the tank 11 and the planting hole 1 are located in the container 4, or by rotating the rod 251 relative to the pivotal member 214 to adjust the contact member 215, when the contact member 215 is located close to the movable member 213, the required water level that the float member 25 is located is lower if the float member 25 is required to pivot the pivotal unit 214 and the contact member 215 is required to push the movable member 213. On the contrary, the water level that the float member 25 is located should be higher if the float member 25 is required to pivot the pivotal unit 214 and the contact member 215 is required to push the movable member 213. Therefore, the present invention can water the soil 5 outside the planting hole 1 by the present invention without using electricity, the plants can be watered properly automatically so as to save labor, time and water.

As shown in FIGS. 5 and 6, although the adjustment of the positions of the float member 25 and the water level control unit 2 can be made by operating the securing member 26 and adjusting the position of the outlet end 216 in the guide pipe 23 so as to control the water level of the tank 11, in order to precisely set the water level of the tank 11 to meet the specific needs of the plants, the rod 251 has a threaded section 2511 which is threadedly connected to a locking hole 2142 of the pivotal member 214, so that when the rod 251 is rotated, the position of the float member 25 is adjusted. As shown in FIG. 7, by rotating the rod 251 clockwise or counter clockwise to move the rod 251 relative to the locking hole 2142, the position of the float member 25 is adjusted and the amount of water supplied to the outside of the tank 11 is controlled.

As shown in FIG. 8 which shows the second embodiment of the present invention, wherein the difference from the first embodiment is that only the bottle unit 2' is used to water the pot or smaller planting area. The second embodiment is an economical way to water the plants, and is not suitable for the plants planted in a large area.

Figure 9:
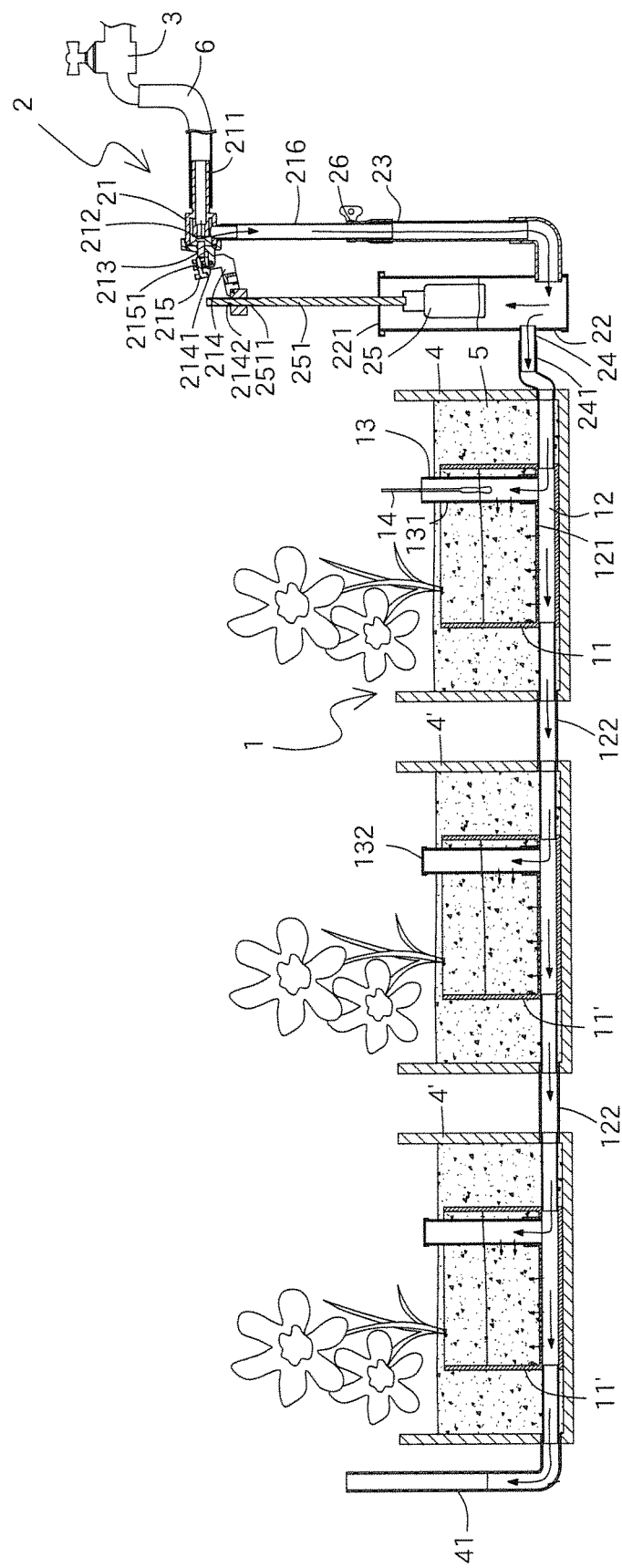
FIG. 9 shows the third embodiment of the present invention, wherein multiple pots are trained together and watered by the present invention.

As shown in FIG. 9 which shows the third embodiment of the present invention, wherein the differences from the first embodiment are that there are multiple tanks 11, 11' and the containers 4, 4' are respectively located in the tanks 11, 11'. Each of the containers 4 has a water pipe 12 extending therethrough, and the water pipes 12 of the containers 4 are trained together by multiple connection pipes 122. The first one of the water pipes 12 is connected to the outlet 24. When water flows from the outlet 24, the water level in the tanks 11, 11', the observation member 13, the tubular member 22 and the transparent pipe 41 is located at the same height. By operating the float member 25 to control the inlet valve 21, the present invention is able to water the plants in the containers 4, 4' simultaneously so as to save time, labor and water.

It is noted that there are multiple water level control units 2 respectively connected to the water pipes 12 of the containers 4 in the tanks 11, such that the control of the water level can be efficiently proceeded. This can prevent the situation that if only one water level control unit 2 is used, the water level in some of the tanks 11 is lower than expected and the plants and soil 5 in some of the containers 4 cannot absorb sufficient water.

Figure 10:
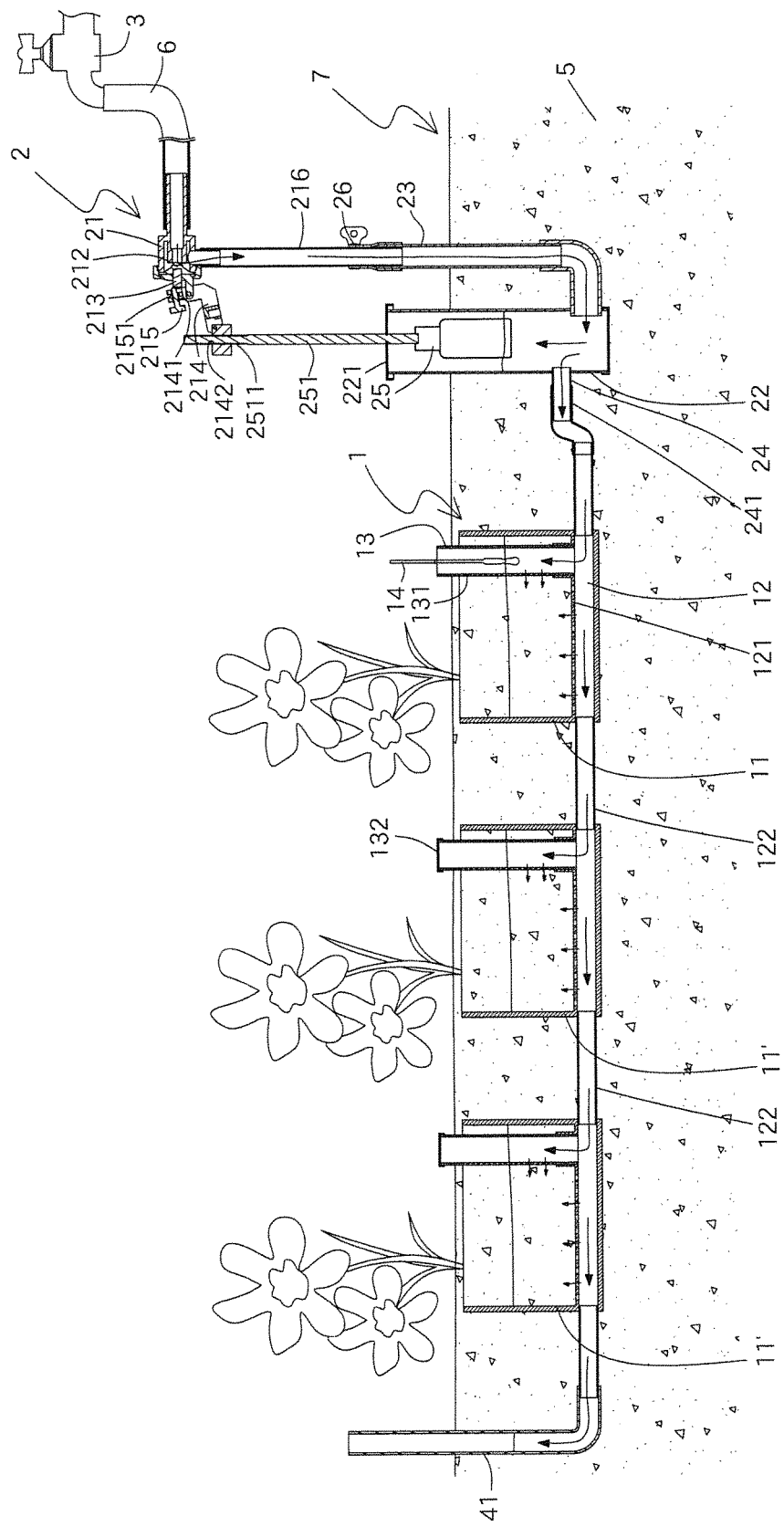
FIG. 10 shows the fourth embodiment of the present invention, wherein the present invention is used on a large planting area.

As shown in FIG. 10 which shows the fourth embodiment of the present invention, wherein the difference from the first embodiment is that there is no container 4, a planting area 7 is provided. Generally, the pots together with the plants in the pots are planted in the soil of the planting area 7. The planting area 7 has an even surface and a portion of at least one water level control unit 2, the planting hole 1 and the tank 11 are merged in the soil 5 of the planting area 7. The surface of the planting area 7 does not higher than the top of the observation member 13, so that water flows into the tank 11 via the hole 121 of the water pipe 12 and the slots 131 of the observation member 13. The water will permeate into the soil 5 via the tank 11 so be absorbed by the plants. When the water level in the tank 11 moves up and down, the water level in the tubular member 22 moves up and down because the tank 11 communicates with the tubular member 22. The movements of the float member 25 indirectly controls the operation of the inlet valve 21. The rest portion of the operation of the embodiment is similar to that of the first embodiment, and will not described here.

Figure 11:
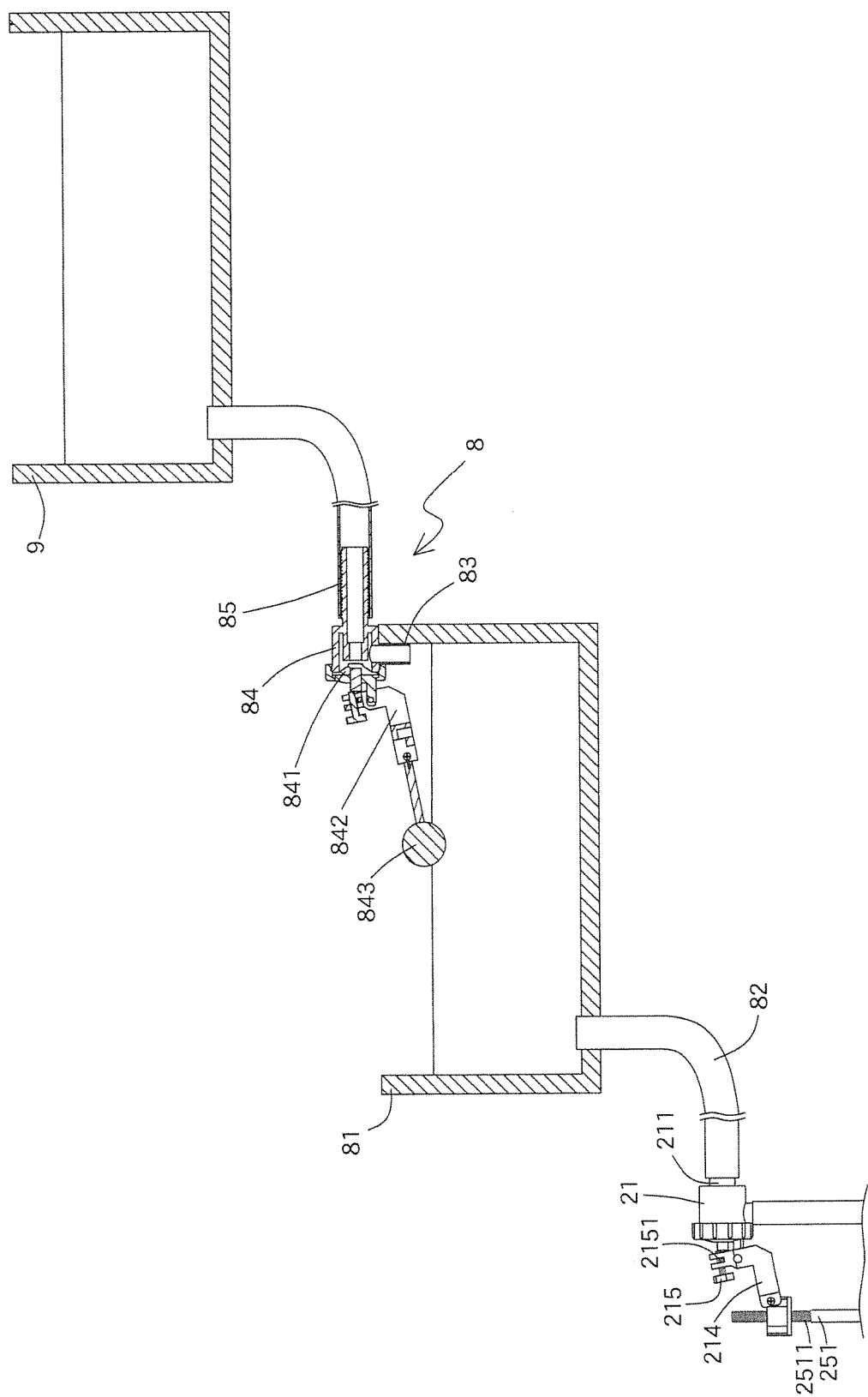
FIG. 11 shows the fifth embodiment of the present invention, wherein the pressure reduction unit is disclosed.

As shown in FIG. 11 which shows the fifth embodiment of the present invention, wherein the difference from the first to fourth embodiments is that the fifth embodiment is connected with a water supply unit 3 such as a faucet. The water is pressurized when it is released from water tower, in order to prevent the pressure from the water supply device 3 is too high such that the floating force of the float member 25 cannot make the seal 212 overcome the pressure from the water supply device 3 and seal 212 will be located close to the inlet end 211 or seal the inlet end 211, so that a pressure reduction unit 8 is connected between the inlet end 211 of the inlet valve 21 and the water supply device 3 so as to reduce the water pressure. For example, the water supply device 3 includes a tank 81 which is located higher than the water level control unit 2. An outlet pipe 82 is connected to the underside of the tank 81 and is connected to the inlet end 211. An inlet pipe 83 is connected to the other end of the tank 81. The inlet pipe 83 is connected between a valve 84 and a pipe 85 which is then connected with the water tower 9. The valve 84 has a seal 841 located corresponding to the pipe 85, and a pivotal unit 842 is located corresponding to the seal 841. The pivotal unit 842 has a float member 843. When the water level in the tank 11 is low and the float member 843 is located at a lower position, the water tower 9 supplies water into the tank 81. A portion of the water flows through the outlet pipe 82 and enters into the inlet end 211, the rest portion of the water is collected in the tank 81. When the water level in the tank 81 goes up and the float member 843 moves up, the pivotal unit 842 contacts the seal 841 which seals the pipe 85 so that the water tower 9 stops to supply water into the tank 81. The water level in the tank 81 can barely affect the water pressure and will not be considered. Therefore, the water pressure is reduced so as to prevent failure of the float member 25 and the seal 212. The rest portion of the operation of the embodiment is similar to that of the first to third embodiment, and will not described here.

While we have shown and described the embodiment in accordance with the present invention, it should be clear to those skilled in the art that further embodiments may be made without departing from the scope of the present invention.

What is claimed is:

1. A watering system comprising:
    at least one planting hole (1) and a tank (11) located in each of the at least one planting hole (1), a water pipe (12) located in the tank (11) and located at an inner end of the at least one planting hole (1);
    a water level control unit (2) located beside the at least one planting hole (1) and having an inlet valve (21) and a tubular member (22), the inlet valve (21) having an inlet end (211), a guide pipe (23) having a first end connected to the inlet valve (21) and communicating with the inlet end (211), a second end of the guide pipe (23) connected to the tubular member (22) which has an outlet (24), a first end of the water pipe (12) connected to the outlet (24) of the tubular member (22), a float member (25) located in the tubular member (22) and located above the outlet (24), the float member (25) connected with the inlet valve (21) and controlling the inlet valve (21);
    an observation member (13) connected to and communicating with the water pipe (12), the water pipe (12) having at least one hole (121) which communicates with the tank (11) of the at least one planting hole (1), the observation member (13) having a float tube (14);
    a bottle unit (2') having a bottle (28), a tube (282) and a height adjuster (27), the bottle unit (2') being connected to the observation unit (13) to supply water to the observation unit (13), the bottle unit (2') cooperating with the water level control unit (2), and
    the float member (25) shuts off the inlet valve (21) when a water level in the tubular member (22) is higher than a pre-set position, the float member (25) turns on the inlet valve (21) when the water level in the tubular member (22) is lower than a pre-set position such that a water level in the tank (11) is maintained.

2. The watering system as claimed in claim 1, wherein a seal (212) is connected to the inlet valve (21) and located corresponding to the inlet end (211), a movable member (213) extends through the seal (212), a pivotal member (214) has a contact member (215) at a first end thereof and the contact member (215) is connected to the movable member (213), a second end of the pivotal member (214) is connected to the float member (25), when the float member (25) moves, the pivotal member (214) is pivoted and the contact member (215) drives the movable member (213) to push the seal (212) which seals the inlet (211) of the inlet valve (21) such that the water level of the tank (11) is controlled.

3. The watering system as claimed in claim 2, wherein the observation unit (3) has multiple slots (131) defined through a wall thereof.

4. The watering system as claimed in claim 3, wherein at least one container (4) is located in the tank (11) and the outlet (24) communicates with the container (4).

5. The watering system as claimed in claim 3, wherein there are multiple planting holes (1) and each of the planting holes (1) has a container (4) located in the tank (11) therein, each of the containers (4) has a water pipe (12) extending therethrough, the water pipes (12) of the containers (4) are trained together by multiple connection pipes (122), one of the water pipes (12) is connected to the outlet (24).

6. The watering system as claimed in claim 5, wherein the connection pipe (12) of one of the containers (4) is connected with a transparent tube (41), the transparent tube (41) is located corresponding to the float member (25) and the tubular member (22).

7. The watering system as claimed in claim 2, wherein the float member (25) is connected with a rod (251) which extends through a cover (221) on the tubular member (22) and is connected to the pivotal member (214).

8. The watering system as claimed in claim 1, wherein the inlet valve (21) has an outlet end (216) which is movably inserted into the guide pipe (23) so as to adjust the float member (25) and the water level control unit (2), a securing member (26) is connected to the outlet end (216) to secure the outlet end (216).

9. The watering system as claimed in claim 7, wherein the rod (251) has a first end connected to the float member (25), a second end of the rod (251) has a threaded section (2511) which is threadedly connected to a locking hole (2142) of the pivotal member (214).

10. The watering system as claimed in claim 1, wherein the inlet end (211) of the inlet valve (21) is connected to a water supply device (3), a pressure reduction unit (8) is connected between the inlet end (211) of the inlet valve (21) and the water supply device (3).

11. The watering system as claimed in claim 1, wherein when using the bottle unit (2') to water plants, the bottle (28) is connected to the observation unit (3), the height adjuster (7) has a threaded tube (271) which is threadedly connected to the height adjuster (7) so as to adjust the threaded tube (271) relative to the height adjuster (7), the bottle (28) has an open end (281) which is connected with the tube (282) which has a lower open end (2822), the tube (282) is inserted into the threaded tube (271) in the height adjuster (27), the bottle (28) is adjusted relative to the observation unit (4) by the threaded tube (271) and the height adjuster (7) so as to control the water level of the tank (11).

* * * * *